United States Patent [19]
Larsen et al.

[11] Patent Number: 5,798,633
[45] Date of Patent: Aug. 25, 1998

[54] BATTERY ENERGY STORAGE POWER CONDITIONING SYSTEM

[75] Inventors: Einar V. Larsen, Saratoga; Robert W. Delmerico, Clifton Park, both of N.Y.

[73] Assignee: General Electric Company, Fort Wayne, Ind.

[21] Appl. No.: 690,293

[22] Filed: Jul. 26, 1996

[51] Int. Cl.$^6$ .................. G05F 1/70; H02M 3/24; H02J 1/00
[52] U.S. Cl. .................. 323/207; 363/98; 307/87
[58] Field of Search ................... 323/224, 207; 363/37, 35, 41, 98, 95; 307/82, 87, 66

[56] References Cited

U.S. PATENT DOCUMENTS

| | | | |
|---|---|---|---|
| 4,366,389 | 12/1982 | Hussey | 307/66 |
| 4,641,042 | 2/1987 | Miyazawa | 307/66 |
| 5,010,467 | 4/1991 | Tokiwa et al. | 363/37 |
| 5,047,913 | 9/1991 | DeDoncker et al. | 363/95 |
| 5,187,427 | 2/1993 | Erdman | 323/207 |
| 5,369,353 | 11/1994 | Erdman | 323/207 |
| 5,373,195 | 12/1994 | DeDoncker et al. | 307/45 |
| 5,537,307 | 7/1996 | Hirose et al. | 363/79 |

OTHER PUBLICATIONS

10 MW GTO Converter For Battery Peaking Services Loren H. Walker, IEE Trans. IAS, Jan./Feb. 1990, vol. 26.
Design Methodologies For Soft Switched Inverters, Divan, Venkataramanan, R.W. DeDoncker, IEEE, 1988.

Primary Examiner—Peter S. Wong
Assistant Examiner—Rajnikant B. Patel
Attorney, Agent, or Firm—Enrique J. Mora

[57] ABSTRACT

A method and apparatus for controlling a battery energy storage system of the type in which an inverter is coupled to convert direct current power from a DC source to a controlled frequency AC power suitable for supplementing utility power or for replacing utility power includes a control mechanism for operating the system and either a supplemental or replacement mode in parallel with a utility power system. The system favors frequency control over power control and maintains constant monitoring of frequency output with adjustment of power in response to any frequency shift of the inverter output. The system also includes apparatus for determining a power error signal based upon commanded power output in which the power error signal is applied as a phase shift control signal in the frequency control circuit for regulating the real component of power supplied by the inverter. In one form, the system is illustrated as multiple, parallel connected power control systems coupled to a common DC source for supplying a common AC output and each of the power control systems are regulated in response to the reactive component of power supplied therefrom so as to promote load sharing between the separate power control systems.

15 Claims, 4 Drawing Sheets

BATTERY ENERGY STORAGE POWER CONDITIONING SYSTEM

BACKGROUND OF THE INVENTION

The present invention is directed to a battery energy storage system for supplementing utility power and, more particularly, to a control system for regulating power transfer from and to the battery energy storage system to allow the battery to be used in load leveling applications or to replace utility power in the event of utility power failure.

There are numerous industrial, commercial and electric power utility applications in which it is desirable to provide battery energy storage systems with power capability varying from 0.5 to 40 megawatts and being capable of supplying such power for anywhere from about thirty minutes to about four hours. For example, a paper manufacturing facility or a steel rolling mill requires an orderly shutdown process in order to avoid major damage and loss of material. While the use of battery backup systems have been known for several years in smaller applications, it is only in recent years that attention has been focused on providing large battery backup systems capable of supplying power for operating industrial applications such as paper and steel rolling mills. Further, while supplying backup electrical power in the case of utility failure is critical to economic operation of some industrial facilities, it is also important to be able to provide battery power to accommodate load leveling at the industrial facility. Load leveling may be required in the event of voltage depression or in instances in which temporary excess power is demanded by the industrial application. Using load leveling to accommodate short-term, above average demand reduces the overall energy cost for the industrial application.

Battery backup systems in the form of uninterruptible power supplies (UPS) are known in the art. In a conventional UPS application, typically designed for low power operation, all of the power to the load comes through the UPS so that the load has no direct connection to a power utility grid. Another form of application provides an isolated UPS that is charged from a separate circuit rather than directly from the utility and is isolated from the load until utility power fails. In either case, the basic hardware components of the battery energy storage system are a power conditioning system which provides bidirectional power conversion between the direct current (DC) battery system and the alternating current (AC) utility system, and a battery to supply the energy storage capacity. The typical power conditioning system includes a voltage source inverter designed to operate in an inversion mode when discharging the battery to supply the AC load or in a rectifying mode when the battery is being charged. Typically, high speed solid state electronic switches are operated in a pulse width modulation (PWM) mode to generate an AC voltage waveform with relatively little distortion.

It is not believed that any of the prior systems have the capability for functioning in both a load leveling function and in a power backup system isolated from the utility.

SUMMARY OF THE INVENTION

Among the several objects of the present invention may be noted the provision of a method and apparatus incorporated in a power conditioning system for use with a battery energy storage system which provides an improved interface between the battery and a power distribution network; an improvement in power conditioning system regulator operation and structure for improved control or limit of power flow, terminal voltage and line current; and the provision of an improved method and apparatus incorporated in a power conditioning system which has the capability of operating in both a load leveling application synchronized to utility voltage and frequency and as a backup power source isolated from the utility power when utility power fails. In an illustrative embodiment, the invention comprises a battery backup control system for controlling a solid state inverter coupling a battery in parallel power transfer with the utility power system. The utility power system normally supplies AC electric power to a reactive load. The inverter includes a plurality of solid state, electronically controlled switches connected in circuit with at least one transformer with the transformer providing an interface between the battery backup system and the AC power system and the load. The solid state switches in the inverter are responsive to electronic control signals which gate the switches into and out of conduction so as to create a sine wave coupled through the transformer when the battery is used to supplement or backup the utility power. The control system comprises a gating logic circuit for generating the electronic control signals in response to a voltage command signal and a phase command signal, the voltage command signal establishing the conduction times of the controllable switches and the phase command signal establishing the output frequency and phase of the inverter output voltage. A voltage regulator is coupled for receiving a voltage error signal representative of any difference between a desired magnitude of voltage from the inverter and a measured magnitude of voltage at the inverter output. The voltage regulator is responsive to the voltage error signal for generating the voltage command signal with a magnitude and polarity sufficient to minimize the value of the voltage error signal. A power regulator monitors the frequency and phase of the inverter output voltage and compares the frequency and phase to a reference frequency for generating the phase command signal for maintaining the frequency and phase of the output voltage at the reference frequency. The power regulator includes a power processing circuit for receiving a power error signal representative of any difference between measured real power output of the inverter and a desired power signal and for generating a phase shift signal for summation with the phase command signal for regulating the real component of power supplied by the inverter.

The battery control system further includes a regulator droop control responsive to the magnitude of reactive power for modifying the voltage error signal inversely with such magnitude in order to promote load sharing between parallel connected inverters coupled from the battery and AC load. The system also includes circuitry for limiting the magnitude of the voltage command signal between positive and negative limits and uses an inertial regulator for limiting the rate of change of the phase command signal. Still further, the power regulator includes apparatus for summing a first signal representative of the frequency of the inverter output voltage for the second signal representative of a desired output voltage frequency to produce a frequency error signal. A proportional plus integral regulator receives the frequency error signal and produces a frequency biasing signal corresponding to the frequency error. An amplifier receives the frequency error signal and provides a controlled amount of gain so that the signal can be summed with the frequency biasing signal to produce a power offset signal. The power offset signal is summed with a desired power signal to adjust inverter power output to a value sufficient to permit regulation of an inverter output frequency to a desired value. Adjustment of power may be necessary in order to assure that the frequency of the inverter remains constant. One reason for maintaining constant frequency is that the AC load generally includes inductive motors whose speed is related to power frequency.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figures 1, 2:
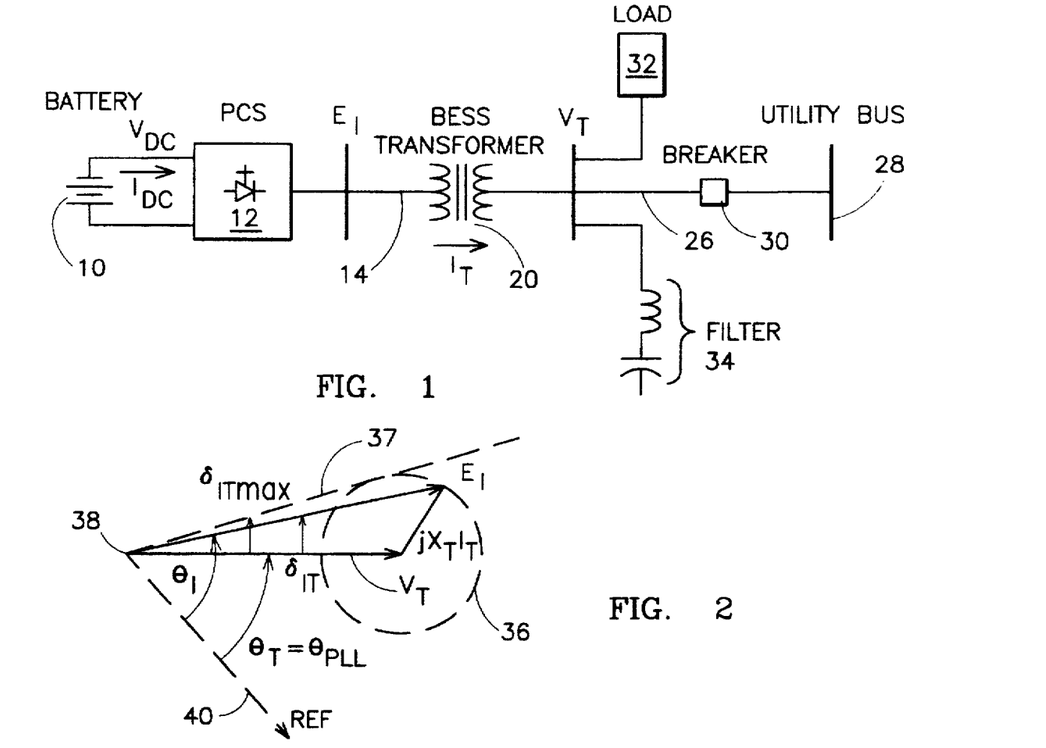
FIG. 1 is a simplified one-line diagram of a battery energy storage system.
FIG. 2 is a phasor diagram for inverter voltage and phase angle.

Referring now to FIG. 1, there is shown a simplified one line schematic representation of a battery energy storage system. The battery is indicated at 10 and supplies direct current power through a power conditioning system 12 to a three-phase bus 14. While the description refers to a "battery" as an auxiliary power source, it is to be understood that other types of energy storage devices could be used such as, for example, capacitive systems or fuel cells. Furthermore, magnetic energy storage devices could be used but might require conversion circuitry to adapt their constant current characteristic to a constant voltage characteristic. The voltage on the three-phase bus is indicated by the vertical line $E_f$. The three-phase bus 14 couples to primary windings 18 of a power transformer 20. The secondary windings 22 of the power transformer are coupled to another three-phase bus 26. The bus 26 is isolated from a utility bus 28 by a three-phase breaker 30. A load 32 is coupled to the three-phase bus by a terminal bus indicated at $V_T$. The three-phase lines 26 may include inductive and capacitive filtering as indicated by the LC filter 34 coupled to the terminal bus $V_T$. For the purpose of this description, the voltage at the load will be considered to be the voltage $V_T$ at the terminal bus. It will be appreciated from this one line diagram that the battery 10 is essentially coupled in parallel power supply arrangement with the utility bus 28 so that in the event that power at the utility bus 28 is interrupted, power can be supplied from the battery 10 to the load 32. Further, the power supply from the utility bus 28 can be supplemented by power from the battery 10. This arrangement clearly differentiates from conventional UPS systems in which the power from utility bus 28 would pass through the power conditioning system 12, i.e., the utility bus, battery backup and load would be connected in a series circuit. Furthermore, the power control system 12 preferably includes a voltage source inverter designed to operate as either an inverter when discharging the battery or as a rectifier when the battery is being charged. More particularly, the power conditioning system 12 must be bidirectional to allow the battery to be charged from the utility power bus 28.

For most operating conditions, the invention is generally achieved by making the power conditioning system regulator 12 operate so that the circuit has the apparent equivalence of a voltage source $E_I$ driving the reactance of the transformer 20 to produce output voltage $V_T$. The phasor diagram of FIG. 2 illustrates the essential feature of the battery energy storage system operation. The generated voltage $E_I$ must be completely controllable within the current rating of the converter equipment, i.e., the AC current from the power conditioning system can be supplied at any phase angle relative to the terminal voltage $V_T$. This permits the system to generate real and reactive power in all four quadrants. The battery energy storage system power generating capability is then limited only by the rating of the inverter and transformer within the power conditioning system and the available battery voltage. The active and reactive power controls are independent within the constraints of the inverter capacity. In FIG. 2, the capability curve is illustrated by the phantom line 36 with the center of the capability curve being defined by the end point of the terminal bus voltage $V_T$. The voltage $E_I$ always lies on or within the dash line 36 with the phase angle of $E_I$ with respect to $V_T$ being determined by the transformer reactance voltage $jX_T I_T$ where $I_T$ represents the net transformer current. The angular displacement between the voltage $V_T$ and the voltage $E_I$ is represented by the measurement $\delta_{IT}$, where $\delta_{IT}$ represents a phase shift signal modifying the phase angle $\theta T$. The maximum value of $\delta_{IT}$ is illustrated by the dotted line 37 extending from the origin 38 tangent to the capability curve 36. For purposes of operating the power conditioning system 12, an arbitrary phasor reference 40 is established with the displacement of the phasor $E_I$ being given by the angle $\theta_I$ and the displacement of the phasor $V_T$ being given by the angular displacement $\theta T$ or $\theta P_{LL}$. $\theta T$ is actually the measured angular displacement of the phasor $V_T$ while the value $\theta_{PLL}$ is the phase lock loop angle to be described in conjunction with the operation of the power conditioning system 12.

Figure 3:
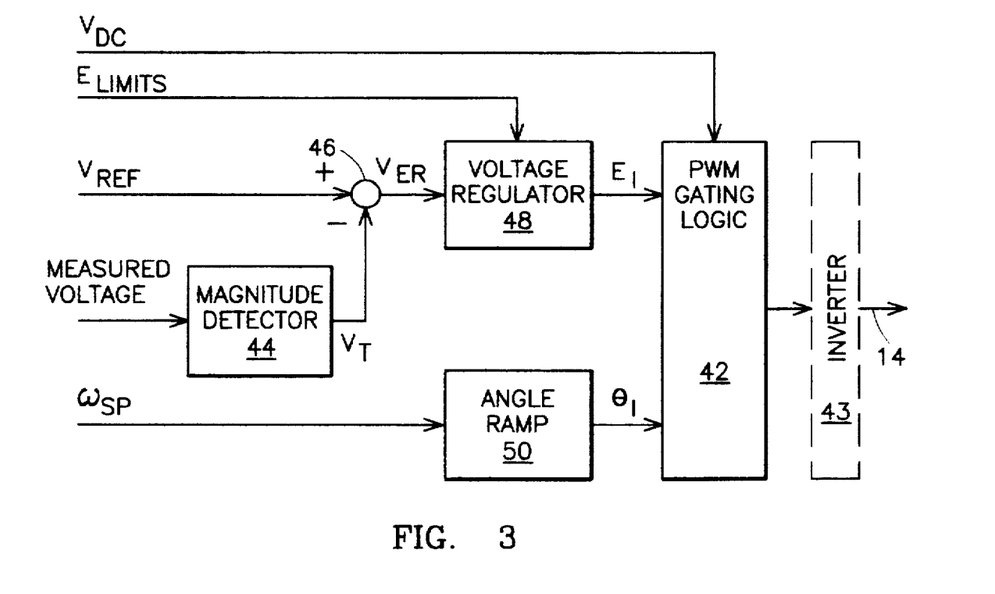
FIG. 3 illustrates a basic control for an uninterruptible power supply.

To better understand the present invention, reference is first made to FIG. 3 which shows a basic control scheme for a simple uninterruptible power supply (UPS) in which the load is served entirely from the power control system with no connection between the power control system and the utility grid. The basic control comprises a pulse width modulation (PWM) gating logic circuit 42 which interfaces to the power converter/inverter switching devices of inverter 43. Preferably, the switching devices are solid state electronically controllable switching devices such as gate turnoff (GTO) devices. The PWM gating logic circuit 42 accepts a voltage magnitude command signal $E_I$ and a phase command signal $\theta_I$ and translates the signals $E_I$ and $\theta_I$ into gate pulses so that the fundamental component of the PWM wave created at the inverter output terminals has the desired voltage magnitude $E_I$ and phase $\theta_I$. While the signals $E_I$ and $\theta_I$ represent the desired voltage and phase relationship for the AC output voltage of the inverter, it will be recognized that the signals are DC values representative of the desired outputs. However, the identifiers $E_I$ and $\theta_I$ are also used to indicate the actual output voltage magnitude $E_I$ and voltage phase angle $\theta_I$. The voltage $V_T$ on bus 26 (the load voltage) is measured and is used to enhance the accuracy of the magnitude portion of the PWM output waveform. In this regard, a signal representative of the measured magnitude of voltage $V_T$ is supplied to a magnitude detector 44 whose output is proportional to the voltage $V_T$ and is supplied to a summing junction 46. A second input of the summing junction 46 is a reference voltage $V_{REF}$ and the output of the summing junction is a voltage error signal $V_{ER}$, i.e., the difference between the desired or selected magnitude of load or output voltage $V_{REF}$ and the measured output or load voltage $V_T$. A voltage regulator 48 utilizes the error voltage $V_{ER}$ to adjust the magnitude of the internal reference voltage $E_I$ to maintain the terminal voltage at a desired set point. The voltage regulator may be constrained by voltage limits indicated by the input signal $E_{LIMIT}$. This prevents the voltage regulator output from attempting to drive the reference voltage $E_I$ outside of a desired range of voltage. The angle $\theta_I$ is generated from a constant frequency setpoint of $\omega_{SP}$ which is applied to a ramp generator circuit 50. The ramp generator circuit 50 provides a repetitive ramp output signal for controlling the PWM gating logic circuit in which the ramp output varies uniformly from zero to 360 electrical degrees. The PWM gating logic signal although shown as a single line output actually comprises a plurality of parallel output signals supplied to the multiple stage PWM inverter 43. The PWM inverter 43 is operated to supply a pulsed output signal to segments of a multi-stage power transformer. The details of the PWM inverter 43 and the power transformer are given in Vol. 26 of the January/February 1990 issue of the IEEE/IAS Transactions at page 63, et seq. in an article entitled "Ten Megawatt GTO Converter For Battery Peaking Service" authored by Loren H. Walker, the disclosure of which is hereby incorporated by reference.

As shown in the above mentioned IEEE Transaction article, the power inverter 43 actually comprises three identical power units feeding nine single phase transformers. The inverter operates as an eighteen pulse, stepped wave, bidirectional, voltage source GTO converter. Each GTO in the inverter is paralleled by a reverse diode to give the converter the capability of handling power flow in both directions. In the embodiment described in the above mentioned article, the converter is constructed as three identical six-pulse inverter cabinets with each cabinet being designated as a power conversion module. Each cabinet contains two, three-phase bridges of GTO's including a leading three-phase bridge and a retarded three-phase bridge. Each GTO is gated with a 60 Hz squarewave, 180° conduction signal with the GTO gating within the three-phase bridges being displaced 120° in a conventional manner. Within each array of leading and retarded bridges, one GTO is gated on every 20 degrees to provide the stepped voltage output. The transformer primaries are connected between corresponding points on the two three-phase bridges with the secondaries of the transformers being connected in a zig-zag connection to form an eighteen pulse stepped wave output voltage, i.e., an output voltage having eighteen pulses per 360 electrical degrees. The turns ratios of the transformers are selected to obtain the desired waveform in the line to line voltage. The detailed description of the inverter, the voltage output and the operation of the inverter is given in greater detail in the IEEE Transaction paper.

While an inverter-driven power transformer arrangement has been initially implemented, it will be recognized that the transformer could be replaced by a filter reactor if the inverter voltage matches line or utility voltage. Such matching may occur if the voltage source is regulated, for example, by using a series chopper or other control means to regulate voltage. Thus, the interface between the inverter and utility or load system may be a coupling means other than the transformer illustrated in the IEEE Transaction paper.

Figure 4:
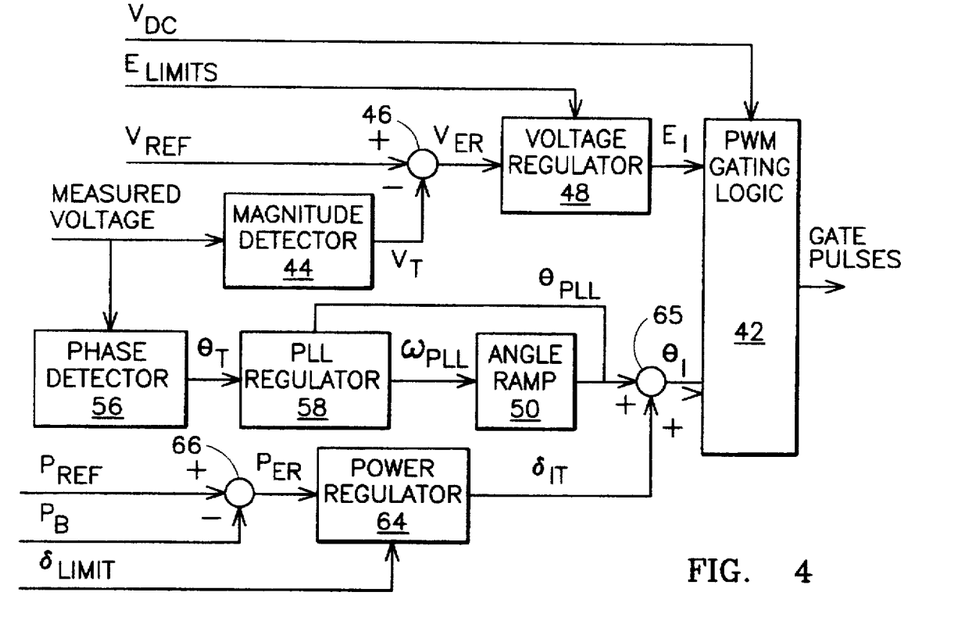
FIG. 4 illustrates one form of prior art control for a battery energy storage system.

FIG. 4 illustrates a basic control for a battery energy storage system which is connected to a utility system and is always operated in a utility connected mode. The basic control is similar to the control illustrated in FIG. 3 except that synchronizing functions have been provided to synchronize the inverter output waveform to the power utility waveform, both in phase and frequency. The synchronizing function is provided by detecting the phase of the measured voltage output from the power inverter in a phase detector 56. The output signal $\theta T$ from phase detector 56 represents the phase of the voltage $V_T$ which is the voltage supplied by the utility. The phase signal is supplied to a phase lock loop (PLL) regulator 58 of a type well known in the art which generates a phase lock loop frequency output signal $\omega PLL$. The signal $\omega PLL$ is supplied to the angle ramp generator 50 in place of the previously supplied signal $\omega_{SP}$. The ramp generated by angle ramp generator circuit 50 becomes the phase lock loop feedback signal $\theta_{PLL}$ supplied to the PLL regulator 58. The phase lock loop circuit including the PLL regulator and angle ramp 50 is a conventional type of phase regulator well known in the art and provides the synchronizing function to control the phase of the inverter terminal voltage $E_I$. Referring back to FIG. 2, it will be noted that the angle $\theta_1$ is the angle between the arbitrary reference and the voltage $E_I$. The signal $\theta T$ from the phase detector 56 is the angle between the reference and the terminal bus voltage $V_T$. As long as the system is operating in steady state, the angle $\theta_T$ and the angle $\theta_{PLL}$ will be the same angle. Since the control of FIG. 4 is intended to be operated in conjunction with utility power, there is no separate independent frequency reference signal supplied to the phase lock loop.

The phase signal provides a handle for controlling the amount of real power supplied by the power inverter 43. More particularly, the amount of reactive power versus the amount of real power coupled through the transformer 20 (or 54) can be adjusted by controlling the angle $\theta_I$. Referring again to FIG. 2, the value $\theta_I$ represents the displacement of the voltage phasor $E_I$ from the arbitrary reference indicated by line 40. The offset between the voltage phasor $V_T$ and the voltage phasor $E_I$ is the transformer reactance voltage. This angle determines the amount of real power that is forced to flow through the transformer reactance whether being moved into the utility system or into the battery system. The phase shift signal $\delta_{IT}$ is used to adjust the value of $\theta_I$ to vary this angle and thereby to control the amount of real power flowing through the transformer. The signal $\delta_{IT}$ is developed by a simple power regulator 64 operating as an integrator on a power error signal $P_{ER}$ and is summed with $\theta_{PLL}$ at summer 65 to produce $\theta_I$. The power error signal is generated by the difference between an actual measured real power component $P_B$ and a power reference $P_{REF}$ developed at summing junction 66, where the power reference signal $P_{REF}$ represents the desired power output of the inverter. A $\delta$LIMIT signal supplied to the power regulator 64 controls the limits by which the value of $\delta IT$ can be varied to control the angle between $V_T$ and $E_I$.

Figure 5:
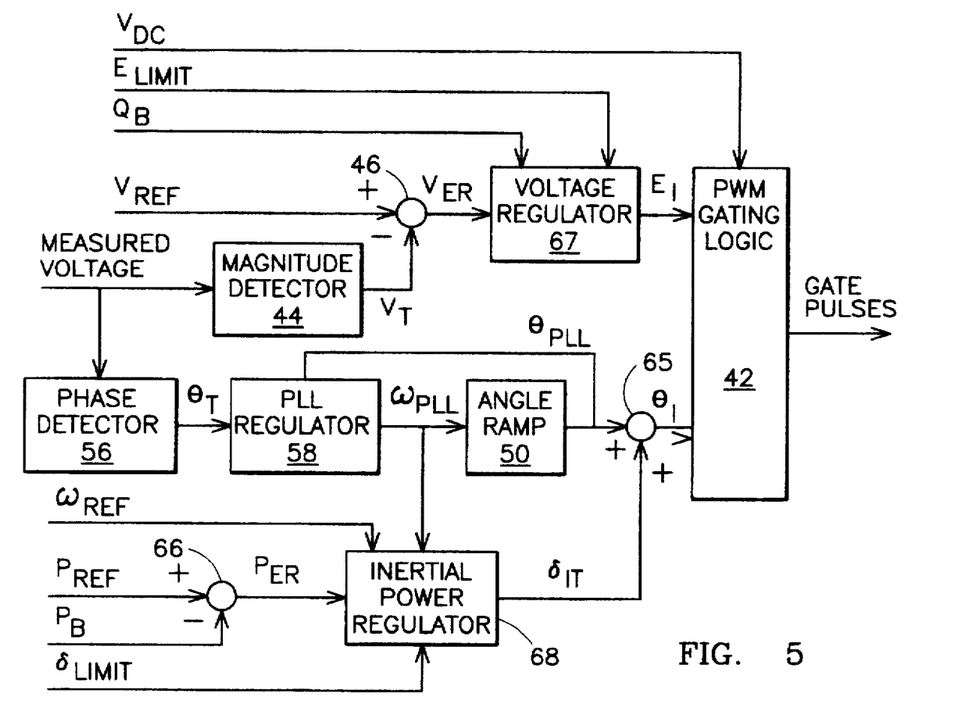
FIG. 5 is a simplified block diagram of a battery energy storage system in accordance with the present invention.

Turning now to FIG. 5, there is shown a functional block diagram of a control system in accordance with the present invention which can achieve the desired transition functions between the connected and isolated modes of operation described with regard to FIGS. 3 and 4. It will be noted that among the improvements over the prior art are the use of measured terminal bus frequency $\omega P_{LL}$ to bias the commanded power, the use of an inertial type of regulator to generate the angle δIT and the configuration of the control to modulate the normal utility connected power. This arrangement eliminates any need for structural changes when switching between connected and isolated modes of operation. The other structural differences between the system of FIG. 4 and that of FIG. 5 is in the use of measured reactive power $Q_B$ as an input signal to a modified voltage regulator 67, the provision of a frequency reference signal $\omega_{REF}$ to an inertial power regulator 68 (replacing power regulator 64) along with the coupling of the signal $\omega_{PLL}$ from the phase lock loop to the power regulator 68. The signal $\omega_{REF}$ represents a desired frequency of the output voltage generated by the inverter and would typically be representative of a frequency of 60 Hz for U.S. use. The signal $\omega_{PLL}$ during stable operation represents the actual output voltage frequency. The particular function implemented by the addition of the signals $\omega_{REF}$ and $Q_B$ and the changing of the power regulator to an inertial type of power regulator is described in more detail with respect to FIGS. 6 and 7.

Figure 6:
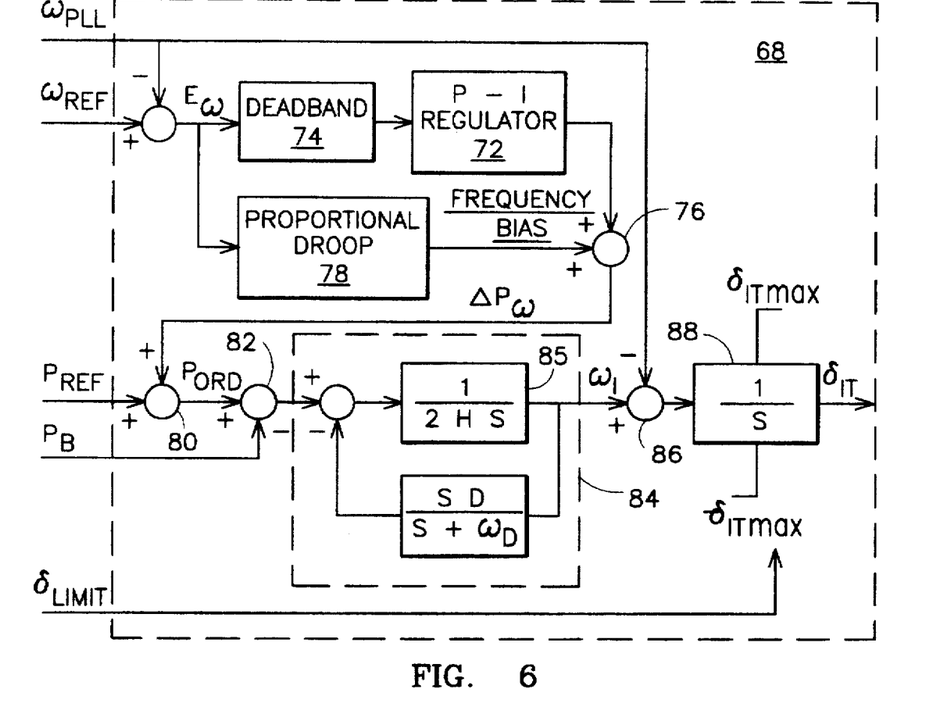
FIG. 6 is a simplified functional block diagram of the power regulator of FIG. 5.

Turning now to FIG. 6, there is shown an expanded block diagram of the power regulator with the frequency reference signal $\omega_{REF}$ and the phase lock loop frequency signal $\omega_{PLL}$ being combined to generate the frequency error signal $E_\omega$. As can be seen, the $\omega_{PLL}$ signal which represents the actual frequency of the inverter output is subtracted from the $\omega_{REF}$ signal in a summing junction 70 to generate the Eω error signal. The Eω error signal is provided to a frequency bias circuit comprising a first control loop including a conventional proportional plus integral regulator 72 and a deadband circuit 74. The deadband circuit provides some range of variation of the frequency error signal, for example, approximately ½ Hz without any change of output signal. This limits response due to natural fluctuations of the power system frequency. The proportional plus integral regulator 72 converts the error signal to a conventional bias signal which is applied to a summing junction 76. A second loop includes a proportional droop circuit 78 which may be an amplifier with a fixed gain that receives the $E_\omega$ error signal and provides an immediate compensation signal to the summing junction 76, the compensation signal being added to the output signal from the proportional plus integral regulator 72. The output of the summing junction 76 is a power offset signal which is coupled to a summing junction 80 whose other input is the power reference signal $P_{REF}$. Accordingly, the frequency offset signal from summing junction 76 serves to modify the power reference signal. The purpose of such modification is to adjust the power reference signal as a function of frequency shifts. More particularly, the intent of the system is to attempt to hold the system output frequency constant so that if there is an error between the output frequency and the reference frequency, the power reference signal is adjusted to compensate for the frequency error. Still further, the power system to which the inverter is coupled may include reactive loads such as alternating current induction and synchronous motors whose speed is directly related to the frequency of the inverter output signal. If additional power is supplied from the inverter, the machines will tend to accelerate while a reduction in power will cause the frequency to drop due to the inductive reaction of the machines as they begin to slow down. Accordingly, the frequency bias circuit provides an important function in enabling control of the torque output of the machines coupled to the inverter output.

The improved power regulator 68 also introduces an inertial regulator 84 which modifies the power error signal to simulate the inertia of synchronous machines. More particularly, the inertial regulator 84 prevents sudden frequency changes or power changes which can cause transient torques to be generated by the motors coupled to the inverter output if sudden changes in the inverter output are experienced. The inertial regulator comprises a conventional electronic circuit having the characteristics of an integrator in that its output signal gradually increases in response to an increase in the input signal.

If the power reference signal is modified by the frequency bias circuit, the resultant signal identified as $P_{ORD}$ is developed at an output terminal of the summation circuit 80 and applied to a summation circuit 82 where the commanded power or ordered power is compared to the measured output power $P_B$ of the system. Note here that the signal $P_B$ represents the real power developed at the output of the inverter. The output signal from the summation circuit 82 represents the power error signal which is applied to the inertial regulator 84. The signal developed by the inertial regulator as described above represents the desired frequency $\omega_1$ of the internal voltage $E_1$ and, if the frequency is properly tracking, will be the same as the frequency $\omega P_{LL}$. In this regard, the signal $\omega_I$ developed at the output of the inertial regulator 84 is summed in a summing junction 86 with the $\omega_{PLL}$ signal. Any difference between the phase lock loop frequency and the signal $\omega_1$ results in an error signal which is applied to an integrator 88 to develop the $\delta_{IT}$ signal described with regard to FIG. 5. The integrator 88 is a conventional type of integrator whose output signal $\delta_{IT}$ is an angle offset which can be summed with the output signal from the phase lock loop described in FIG. 5 to generate the output signal $\theta_1$. It will be recognized that the $\omega_{PLL}$ signal is taken from the phase lock loop as shown in FIG. 5 and therefore represents the actual frequency of the inverter output signal. In the event that the utility breaker opens suddenly, the $\omega_{PLL}$ signal will represent the actual frequency of the voltage being generated by the inverter 43 and the power regulator will cause the power output of the inverter to be adjusted as a function of the variation in output frequency. The integrator 85 in the inertial regulator becomes important to limit any attempted frequency change in the control system. It will be recognized that the settings of the deadband 74, the gain at the proportional droop block 78 are selected to coordinate with the variations of the power system to which the inverter is connected and also with the loads to which the inverter is to supply power. Furthermore, the system can be adapted to modify the settings of the deadband, proportional droop and the inertial regulator in an adaptive manner such as when the status of the utility breaker is changed, either to connect the utility to the system or to disconnect the utility from the load system.

When the battery energy storage system is connected to the utility, the frequency bias circuit and the inertial power regulator force the system to operate as though the battery load were another synchronous machine connected to the utility power. This permits protection circuit and system operation procedures to be virtually the same as standard utility practice. The ability to dynamically adjust parameters for inertia, damping and frequency bias permits the battery energy storage system to provide a beneficial impact on the overall power system when connected.

Figure 7:
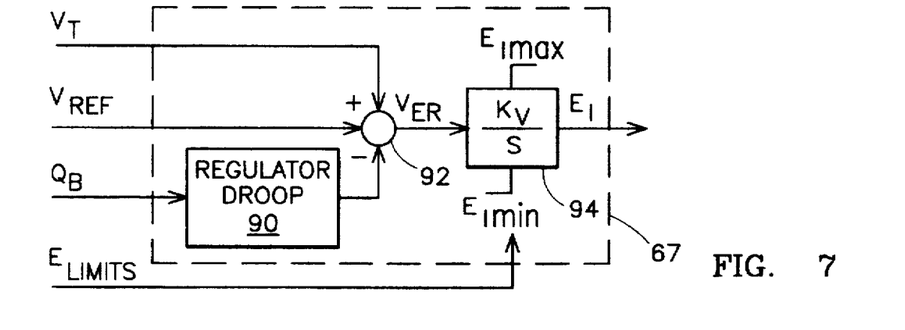
FIG. 7 is a simplified functional block diagram of the voltage regulator of FIG. 5.

Turning now to FIG. 7, there is shown an expanded block diagram of the voltage regulator 48 of FIG. 5. In this voltage regulator, there is provided a new gain control block 90 identified as a regulator droop correction. The block 90 is connected to receive a feedback signal $Q_B$ representing the measured reactive power produced by the inverter 43. The output of block 90 is applied to a summing junction 92 where it is combined with the measured voltage magnitude signal $V_T$ and a voltage reference signal $V_{REF}$. The voltage error signal from the block 92 now represents not only the difference between the voltage reference signal and the voltage magnitude signal but also includes a factor relating to the reactive power produced by the system. The voltage error signal $V_{ER}$ is applied to integral regulator 94 to produce the voltage command signal $E_I$. The magnitude of the output signal from the regulator 94 is limited by a signal $E_{LIMITs}$ to preselected minimum and maximum voltage values $E_{Imin}$ and $E_{Imax}$. It will be noted that the signal from the regulator droop block 90 is subtracted from the effective voltage error signal in block 92 so that if the system connected to the inverter 43 begins to draw too much reactive power, a lower voltage reference is supplied to force the value of $E_I$ to decrease. The purpose of this function is to promote load sharing of reactive power with other power conditioning systems connected in parallel to the common DC source 10. If the value of $E_I$ attempts to increase above the reference value of $E_T$, this will force the reactive component $Q_B$ to increase since the coupling transformer 20 is reactive and any voltage magnitude change will cause more effect on the reactive component of output power than the real component. Note that the angle control as illustrated in FIG. 2 is more effective in controlling real power while voltage magnitude control is more effective in controlling the magnitude of reactive power.

More particularly, if one were to assume an increase in the reference voltage signal $V_{REF}$, the result would be to force the internal voltage $E_I$ to increase and cause generation of more reactive power which will cause the value of $Q_B$ to increase. The feedback of this signal through the regulator droop block 90 will result in a decrease in the voltage error signal by subtraction in summing block 92 to thereby limit the amount of reactive power flowing. If the system is connected to a stiff power system, the magnitude signal $V_T$ would not change rapidly and would cause $E_I$ to continue to rise to force $V_T$ to increase thereby causing $E_I$ to ramp up rapidly. By introducing the $Q_B$ droop, the ramp up of the internal signal $E_I$ is restricted. This function promotes sharing of power between multiple power conditioning systems if the transformers 20 in each of the systems have slightly different characteristics. The advantage is the ability to use less expensive unmatched transformers while still promoting load sharing. Without this function, a battery energy storage system with a smaller transformer impedance will try to carry more reactive load causing more current to flow which might lead to failure of the switching electronics. By introducing the reactive power feedback signal $Q_B$, the $E_I$ value for that particular unit can be caused to be better balanced with the reactive power supplied by other units. While the derivation of the real and reactive parts of the output power is not specifically shown in FIG. 7, it will be appreciated that such function is well known in the art. In particular, it is common to measure terminal volts and phase angle at the inverter output, measure the output current and its phase angle, convert these measured values to power and then compute real and reactive parts by simply computing the sine of the power function to generate a signal representative of the reactive power and to obtain the cosine of the power function to generate a signal representative of the real component power.

Figure 8:
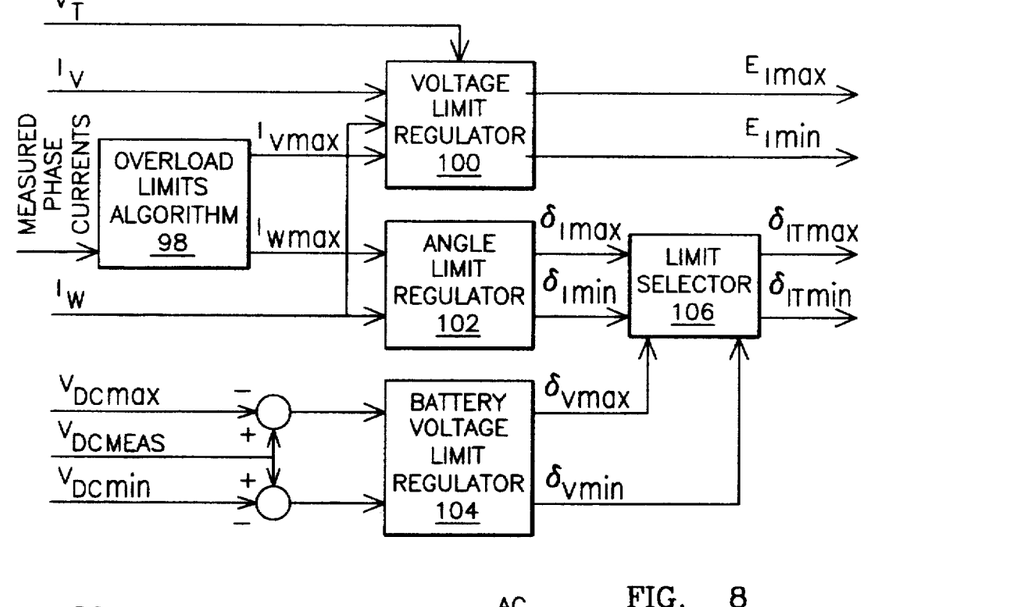
FIG. 8 is a simplified functional block diagram illustrating generation of limit values for use in the system of FIG. 5.

Referring now to FIG. 8, there is shown a simplified block diagram of one method for obtaining the voltage and angle limits used in the block diagrams of FIGS. 6 and 7. Before proceeding with a description of the operation of the functional block diagram of FIG. 8, it is necessary to first understand some basic concepts upon which the limits set in FIG. 8 are determined. As will be appreciated from the above description of the operation of the inventive system, a fast power control may be detrimental to overall power system's stability, particularly when the battery energy storage system is the primary source of power. Accordingly, some of the functions implemented in the present invention are designed to restrict the speed at which the control system responds. The overall concept is based upon maintaining an internal voltage phasor $E_I$ within the current capability of the inverters connected to the battery energy storage system. Referring again to FIG. 2, the boundary 36 represents the maximum allowable current from the battery energy storage system in terms of the voltage drop across the impedance $X_T$ of the transformer 20. Limits are imposed on the voltage magnitude $V_T$ to force $E_I$ to operate within this boundary 36. The current $I_T$ is defined with respect to the terminal voltage $V_T$ and is equal to the values $I_W+JI_V$, where $I_W$ is the real component of current and $JI_V$ is the imaginary component of current through the transformer impedance. As discussed with regard to FIG. 7, one of the functions of the power regulator 68 is to force the real component of current $I_W$ to be the same for each battery energy storage system connected to the load since each system will receive a common frequency and power reference signal. The reactive component of current $I_V$ is controlled by the voltage regulator and balancing of the reactive current requires some droop introduced by the regulator droop 90 in the voltage command signal.

Figure 9:
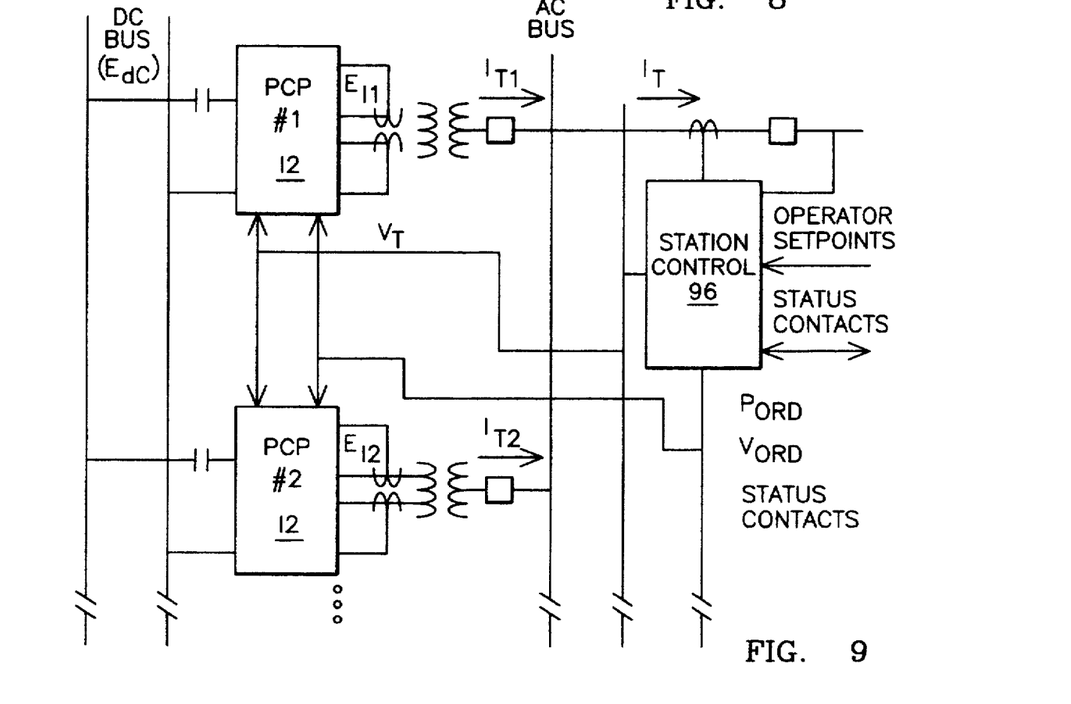
FIG. 9 is a simplified block diagram of a battery energy storage system (BESS) using multiple, parallel connected power conditioning systems.

Before turning to the details of the computation of each of the particular values used in controlling the battery energy storage system, reference is first made to the simplified block diagram of FIG. 9 which illustrates an overview of a conventional battery energy storage system. The system includes a DC bus which provides a voltage $E_{DC}$ from a plurality of batteries and connected to the bus. Typically, the system includes a plurality of batteries arranged in individual strings with each string comprising in excess of a thousand cells in series and each string being connected in parallel to the battery bus. A typical battery bus voltage may run in the range of 1750 to 2860 volts DC. Connected to the battery bus are a plurality of paralleled power conditioning systems (PCS) such as the systems 12 of FIG. 1 with each of the PCS 12s feeding a corresponding one of the transformers 20 connected to the terminal bus $V_T$, labeled as the AC bus in FIG. 9. A station control 96 provides for operator input to set the voltage and power outputs of each of the PCS's 12. The nominal steady-state current for each PCS 12 in per unit values is given by the relationship $$I_T = \frac{P_{ord}}{V_T} + j \frac{(V_r - V_{ord})}{X_{droop}}$$

where $P_{ord}$ is the ordered power as set forth in FIG. 6 and $V_{ord}$ is the voltage reference indicated at $V_{REF}$ in FIG. 7. The value of $X_{droop}$ is the amount of droop created by the functional regulator droop block 90 in FIG. 7. Note that the station 96 may provide control signals to gradually adjust the values of $P_{ord}$ and $V_{ord}$ to maintain system level requirements for the AC bus. As previously mentioned, power control and internal angle of the PCS 12 are based on making the PCS operate with a characteristic similar to a synchronous machine. For example, when connected to a power grid with the utility fully operational, voltage is maintained according to the local area needs established by the station level control and frequency and phase are adjusted to maintain a scheduled power flow to the AC bus. When separated from the grid or during a system startup isolated from the grid, the PCS 12 will establish the frequency and phase of the voltage. In either event, the behavior of the PCS 12 can be made superior to a rotating synchronous machine since the inertia, droop and damping can be set and dynamically adjusted to suit the needs of the overall power system or load.

The PCS control is based on measuring the real power flow into the external AC system at the transformer high side, i.e., on the AC bus side of the transformer 20. The measured power identified as $P_{meas}$ is then compared with an ordered value $P_{ord}$ and processed through the regulator of FIG. 6. The regulator of FIG. 6 is structured as a representation of the inertia (2h) and damping (d) effects of a synchronous machine as indicated by the equations in the inertial regulator 84. Non-windup limits ($F_{min}$, $F_{max}$) are used on frequency to prevent too great an excursion during a transient.

The output of the power regulator $\omega_I$ is the internal frequency of the PCS 12. This frequency signal $\omega_I$ is compared against the measured system frequency $\omega_{PLL}$ calculated by the phase lock loop. The difference frequency is integrated to calculate the angle of the internal voltage relative to the system, the angle being indicated as $\delta_{IT}$. The non-windup limits +$\delta$ITmax and -$\delta$ITmax are applied to the integrator 88 to limit the magnitude of the $\delta$IT function.

Referring again to the voltage regulator, the magnitude of the internal voltage phasor $E_I$ is determined by the voltage regulator of FIG. 7. The control loop uses the integrating block 94 with non-windup limits $E_{Imax}$ and $E_{Imin}$ which are dynamically adjusted to maintain inverter reactive current within the capability of the inverter bridge. Voltage error is calculated as a difference between the voltage command $V_{REF}$ and measured terminal voltage $V_T$. Terminal voltage $V_T$ is measured on the high side of the transformer 20. The droop component from block 90 is calculated as the product of the current $I_T$ in quadrature with the terminal voltage and a droop reactance $X_{droop}$. The internal voltage phasor $E_I$ is scaled by the measured battery voltage ($E_{DCF}$) to generate the proper voltage ratio for the firing pattern generator block 42.

The dynamic voltage limits with respect to the current capability of the PCS 12 are calculated from the magnitude of a voltage phasor which must be added or subtracted from the internal voltage $E_I$ to reach the circular boundary defined at 36 in FIG. 2. One method of performing this calculation is to define a phasor which is parallel with the terminal voltage phasor $V_T$. One can then calculate the intersection of the corresponding parallel line with the voltage circle 36 defined by the maximum value of current. This process requires calculation of an intermediate variable $I_{Vmax}$ from the equation (where $I_{Vmax}$ is limited to positive values):

$$I_{Vmax} = \sqrt{(I_{max}^2 - I_w^2)}$$

where $I_{max}$ is the maximum current capability of the PCS 12 as defined by the circle 36, $I_w$ is the measured real component of current $I_T$ and $I_{Vmax}$ represents the maximum available reactive current capability of the PCS. Voltage limits can then be calculated from this information and the measured terminal voltage to determine the minimum and maximum internal voltage magnitude at the boundary with the line 36. The voltage limits are also compared against the factor $K_{AC}E_{DCf}$ which defines the maximum AC voltage capability of the inverter based on the measured DC voltage. The voltage limits are adjusted to be less than or equal to the factor $K_{AC}E_{DCf}$. This is necessary to prevent wind-up in regulator 88 if the battery voltage is low during a discharge. The equations for minimum and maximum voltage limits are, respectively:

$$E_{Imin} = \sqrt{(V_{Tmeas} - I_{Vmax}X_T)^2 + (I_W X_T)^2}$$

$$E_{Imax} = \sqrt{(V_{Tmeas} + I_{Vmax}X_T)^2 + (I_W X_T)^2}$$

Figure 10:
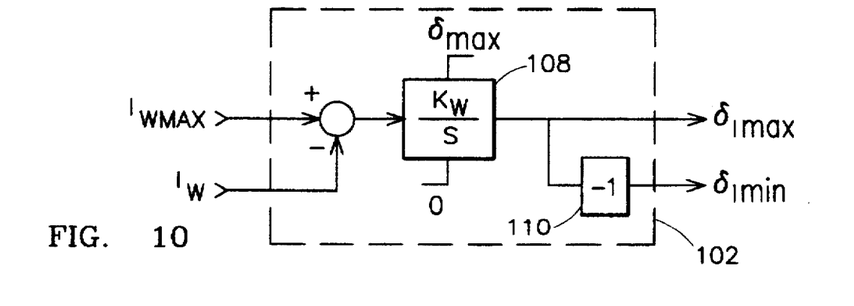
FIG. 10 is a block diagram illustrating one method of generating phase angle limits for use in the system of FIG. 5.

FIG. 9 illustrates real power limiting achieved by clamping the voltage angle phase shift signal $\delta_{IT}$ as a function of the real part of measured current $I_W$. This clamping function is coordinated with the voltage limit calculation to limit the real power component of the current while maintaining the reactive component to within the capability defined by the maximum current $I_{max}$. The values of $\delta_{ITmax}$ and $\delta_{ITmin}$ are determined by the angle limit regulator of FIG. 9. The response of the limit regulator 108 is set by adjusting its integral gain $K_W$. The real component of current limit $I_{Wmax}$ is made equal to a fixed percentage value of $I_{max}$. A value less than 100% (but typically greater than about 80%) is used to limit the real component of current $I_W$ to less than $I_{max}$. During normal operation the regulator is clamped at $\delta_{max}$. The fixed value used for $\delta_{max}$ is based on the maximum angle at nominal per unit voltage (VT=1) in which: $\delta_{max}$= $\sin^{-1}(X_T I_{max})$ Returning now to FIG. 8, the measured phase currents are applied to an overload limit algorithm block 98 which performs the calculations described above to derive the values $I_{Vmax}$ and $I_{Wmax}$. $I_{Vmax}$ is applied to a voltage limit regulator 100 which also receives the measured terminal voltage $V_T$, measured battery voltage $E_{DCf}$, real component of current $I_W$ and reactive component of current $I_V$. The voltage limit regulator uses these values as described above to calculate the values $E_{Imax}$ and $E_{Imin}$. Similarly, the angle limit regulator block 102 receives the values of $I_{Wmax}$ and $I_W$ and uses those values to calculate the angle limits $\delta_{Imax}$ and $\delta_{Imin}$. FIG. 10 is an expanded illustration of block 102 showing use of an integrator 108 with limits o and $\delta_{max}$ for calculating $\delta_{Imax}$ from the difference between $I_{Wmax}$ and $I_W$. The value of $\delta_{Imax}$ is inverted at block 110 to produce $\delta_{Imin}$. The system also includes a battery voltage limit regulator 104 which is responsive to signals representing the difference between the maximum allowable battery voltage $V_{DCmax}$ and measured DC voltage $V_{DCmeas}$ and a signal representative of the difference between the minimum battery voltage $V_{DCmin}$ and $V_{DCmeas}$ to provide the signals $\delta_{Vmax}$ and $\delta_{Vmin}$. The angle signals are applied to the limit selector block 106 which also receives the $\delta_{Imax}$ and $\delta_{Imin}$ signals. The output of the limit selector block 106 are the $\delta$ITmax and $\delta$ITmin signals.

What has been described is an improved power control system for use in connecting a battery energy storage system to an AC power bus for supplementing power from a utility bus or replacing such power in the event of utility failure. The invention provides a method for holding system frequency constant by adjusting the power out of the system so as to control loads such as AC motors. Furthermore, the system promotes load sharing between parallel connected power conditioning systems by limiting reactive power developed by each of the power conditioning systems.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A control system for controlling a solid-state inverter coupling a direct current (DC) power source in parallel power transfer with a utility power system, each of the inverter and utility power system being adapted for supplying alternating current (AC) electric power to a load with a selected load voltage, the inverter including a plurality of solid-state, electronically controllable switches, each of the switches being responsive to electronic control signals for gating the switches into and out of conduction, the system comprising:

- a gating logic circuit for generating the electronic control signals in response to a voltage command signal and a phase command signal, the voltage command signal establishing the conduction times of the controllable switches and the phase command signal establishing the output frequency and phase of the inverter output voltage;
- a voltage regulator coupled for receiving a voltage error signal representative of any difference between the selected magnitude of load voltage and a measured magnitude of voltage representative of load voltage, the voltage regulator being responsive to the voltage error signal for generating the voltage command signal with a magnitude sufficient to minimize the voltage error signal;
- a power regulator coupled for monitoring the frequency of the voltage from the inverter and comparing the frequency to a reference frequency for generating a power offset signal for maintaining the frequency of the voltage from the inverter at about the reference frequency, the power regulator further including:
  - a power processing circuit coupled for receiving the power offset signal, a power error signal representative of any difference between measured real component of power from the inverter and a desired power output of the inverter and for generating therefrom a phase shift signal for summation with a measured phase of the selected load voltage for regulating the real component of power supplied by the inverter.

2. The control system of claim 1 and including a transformer connected in series circuit between the inverter and the load, the transformer having a plurality of windings with each winding being connected to different ones of the switches for providing a stepped voltage output waveform for application to the load.

3. The control system of claim 1 and including a regulator droop control responsive to a measured magnitude of reactive power from the inverter for modifying the voltage error signal inversely with the magnitude of reactive power.

4. The control system of claim 1 and including means for limiting the magnitude of the voltage command signal between positive and negative limit values.

5. The control system of claim 1 wherein the power regulator includes an inertial regulator for limiting the rate of change of the phase command signal.

6. The control system of claim 4 and including means for limiting the magnitude of the phase shift signal.

7. The control system of claim 5 wherein the power regulator further includes means for summing a first signal representative of the frequency of the inverter output voltage with a second signal representative of a desired output voltage frequency to produce a frequency error signal, a proportional plus integral regulator coupled for receiving the frequency error signal and for producing a frequency biasing signal corresponding to the frequency error, an amplifier coupled to receive the frequency error signal and for providing a signal proportional thereto, and means for summing the signal from the amplifier and the frequency biasing signal to produce a power offset signal, and means for summing the power offset signal with the power error signal for adjusting inverter power output to a value sufficient to permit regulation of inverter output frequency to the desired output voltage frequency.

8. A method for controlling an inverter coupled for supplying power derived from a direct current source to an alternating current (AC) power system both during periods in which the power system also receives AC power from a fixed frequency AC utility system and during periods in which the fixed frequency AC utility system is disabled, the inverter including a plurality of pulse width modulated switching devices responsive to a corresponding plurality of gating signals for producing a simulated AC voltage output, the method comprising the steps of:

- generating the gating signals in response to a voltage command signal and a phase command signal, the voltage command signal establishing the conduction times of the controllable switches and the phase command signal establishing an output frequency and phase of the inverter output voltage;
- producing a voltage error signal representative of any difference between a desired magnitude of voltage from the inverter and a measured magnitude of voltage representative of load voltage;
- generating from the voltage error signal a voltage command signal with a magnitude sufficient to minimize the voltage error signal;
- monitoring the frequency of the inverter output voltage and comparing the frequency to a reference frequency for generating a phase offset signal for maintaining the frequency of the output voltage at about the reference frequency;
- generating a power error signal representative of any difference between measured real power output of the inverter and a signal representative of desired power output of the inverter; and
- generating from the power error signal a phase shift signal for summation with the phase command signal for regulating the real component of power supplied by the inverter.

9. The method of claim 8 and including a plurality of substantially identical power control units connected in electrical parallel to the direct current power source, each of the power control units comprising an inverter and inverter control system, each power control unit being coupled to the AC power system through a corresponding one of a plurality of coupling means, the method including the further step of regulating the reactive component of power coupled through each of the coupling means so as to promote load sharing among the power control units.

10. The method of claim 7 and including the step of modifying the voltage error signal inversely with a measured magnitude of a reactive component of power from the inverter.

11. The method of claim 7 and including the step of limiting the magnitude of the voltage command signal between positive and negative limit values.

12. The method of claim 7 and including the step of limiting the rate of change of the phase command signal.

13. The method of claim 11 and including the step of limiting the magnitude of the phase shift angle.

14. The method of claim 9 wherein the step of regulating includes the steps of measuring reactive power produced by the inverter and producing a signal representative thereof, summing the reactive power signal with signals representative of the desired magnitude of inverter voltage and the measured magnitude of inverter voltage, and integrating the resultant summed signal to produce the voltage command signal.

15. The method of claim 14 and including the further step of limiting the voltage command signal to calculated values sufficient to maintain inverter reactive current within the capability of the inverter.

* * * * *